(12) United States Patent
Huchin et al.

(10) Patent No.: US 9,969,035 B2
(45) Date of Patent: May 15, 2018

(54) METHOD FOR PRODUCING A TURBINE ENGINE PART, AND RESULTING MOULD AND INTERMEDIATE BLANK

(71) Applicant: Snecma, Paris (FR)

(72) Inventors: Patrick Emilien Paul Emile Huchin, Moissy-Cramayel (FR); Karine Deschandol, Moissy-Cramayel (FR); Sébastien Digard Brou De Cuissart, Moissy-Cramayel (FR); Serge Fargeas, Moissy-Cramayel (FR); Marc Soisson, Moissy-Cramayel (FR); Anthony Texier, Moissy-Cramayel (FR); Valéry Piaton, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days. days.

(21) Appl. No.: 15/106,124

(22) PCT Filed: Dec. 9, 2014

(86) PCT No.: PCT/FR2014/053246
§ 371 (c)(1),
(2) Date: Jun. 17, 2016

(87) PCT Pub. No.: WO2015/092220
PCT Pub. Date: Jun. 25, 2015

(65) Prior Publication Data
US 2016/0318136 A1    Nov. 3, 2016

(30) Foreign Application Priority Data

Dec. 20, 2013    (FR) ...................................... 13 63344

(51) Int. Cl.
*B22D 25/02*    (2006.01)
*B22C 9/22*    (2006.01)
(Continued)

(52) U.S. Cl.
CPC ................ *B23P 15/02* (2013.01); *B22C 9/22* (2013.01); *B22D 13/06* (2013.01); *B22D 13/066* (2013.01);
(Continued)

(58) Field of Classification Search
CPC .... B22C 9/00; B22C 9/06; B22C 9/22; B22D 13/00; B22D 13/06; B22D 13/066; B22D 13/101; B22D 25/00; B22D 25/02
See application file for complete search history.

(56) References Cited

U.S. PATENT DOCUMENTS

2006/0026832 A1* 2/2006 Bergue .................. B21D 53/78
29/889.72
2012/0048430 A1* 3/2012 Das ........................... B21J 1/00
148/557

FOREIGN PATENT DOCUMENTS

EP    2 067 546 A1    6/2009
EP    2 223 775 A1    9/2010
(Continued)

*Primary Examiner* — Kevin P Kerns
*Assistant Examiner* — Steven S Ha
(74) *Attorney, Agent, or Firm* — Blank Rome LLP

(57) ABSTRACT

The invention relates to a method for producing multiple metal turbine engine parts, comprising steps consisting in:
a) casting a metal alloy in a mold in order to produce a blank (3); and
b) machining the blank in order to produce the parts, characterized in that the blank obtained by casting is a solid polyhedron having first and second sides (30a, 30b) and third and fourth sides (30c, 30d), in which the third and fourth sides extend between the first and second sides, flaring apart from the first side towards the second side, first at a first angle and subsequently at a second larger angle, and said at least one part is machined in the blank.

14 Claims, 3 Drawing Sheets

Figure 1:
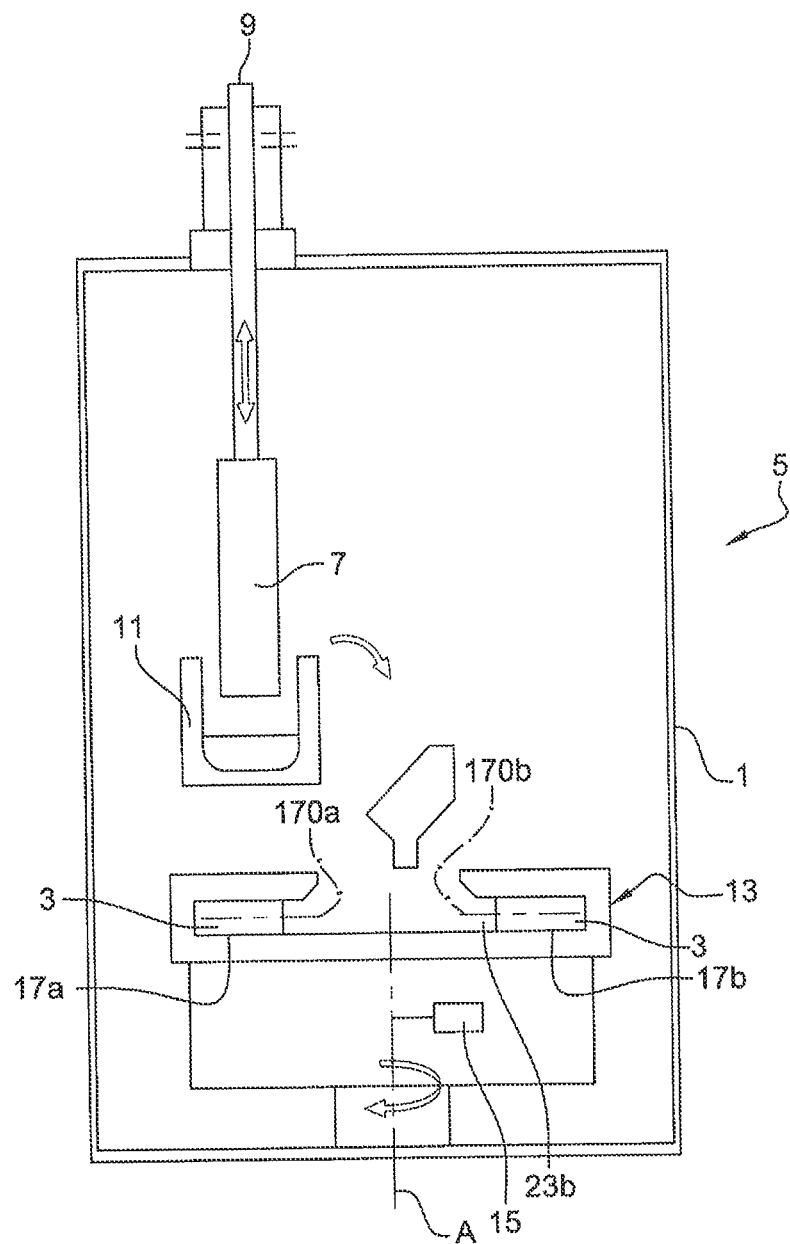

(51) Int. Cl.
    *B23P 15/02*     (2006.01)
    *B22D 13/06*     (2006.01)
    *B22D 27/15*     (2006.01)
    *F01D 5/28*     (2006.01)

(52) U.S. Cl.
    CPC ............ B22D 25/02 (2013.01); B22D 27/15 (2013.01); F01D 5/28 (2013.01); *F05D 2220/323* (2013.01); *F05D 2230/10* (2013.01); *F05D 2230/21* (2013.01); *F05D 2240/30* (2013.01); *F05D 2300/173* (2013.01); *F05D 2300/174* (2013.01); *F05D 2300/608* (2013.01)

(56) References Cited

FOREIGN PATENT DOCUMENTS

| | | |
|---|---|---|
| GB | 2 290 998 A | 1/1996 |
| JP | 2006-336059 A | 12/2006 |
| WO | WO 2008/125129 | 10/2008 |

\* cited by examiner

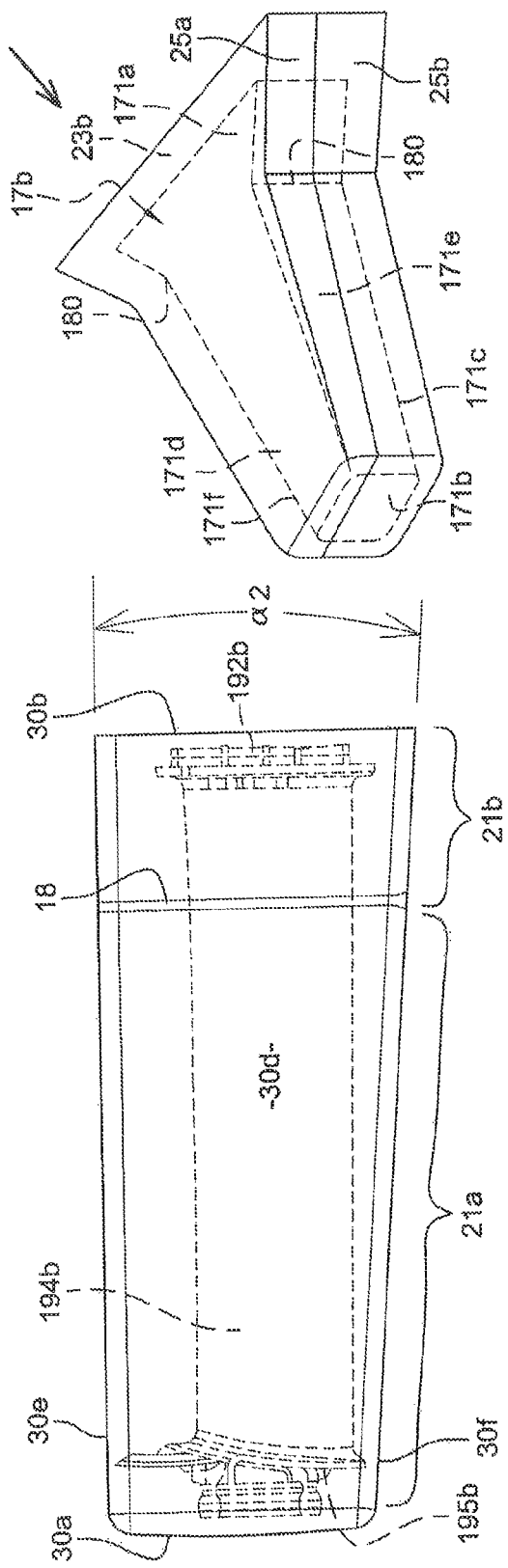
Fig.5
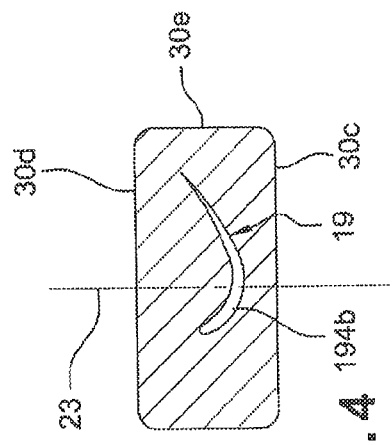
Fig.6
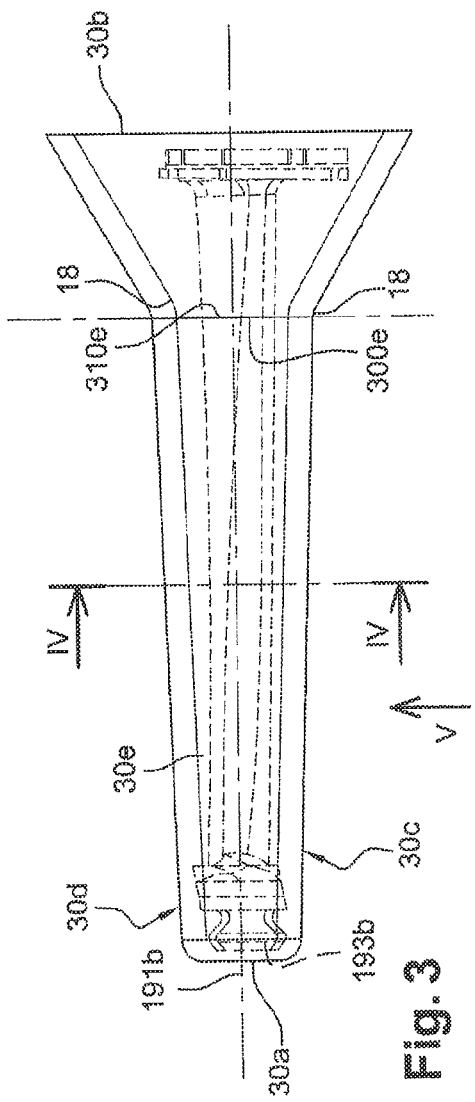
Fig.4
Fig.3

METHOD FOR PRODUCING A TURBINE ENGINE PART, AND RESULTING MOULD AND INTERMEDIATE BLANK

The present invention relates to a method for producing a metal part for a turbine engine, and more particularly the wheel blade for a turbine of a turbojet or a turboprop engine of an aircraft.

To produce such a part, it is known to successively:
a) cast a metal alloy in a mould in order to produce a blank, and
b) machine the blank in order to produce the part, Some cylindrical blanks may have different micro-structures as regards their respective centres and their periphery. This may result in different micro-structures within the same blade.

This is specifically the case for parts made from a TiAl-based metal alloy.

In the present technique, some other blanks are obtained by lost-wax foundry using a ceramic mould, wherein the metal alloy is cast. Developing such single-use mould is difficult. Additionally, interactions between the molten metal and the ceramics may result in casting defects on the surfaces of the blanks, and lost-wax may cause geometrical defects in the blanks, if quality is bad.

Besides, machining (at least) one part in a blank raises difficulties in positioning the part in the blank. The position of such part must be compatible with the practices of foundry, machining, and those of the field which the part is intended for.

The present invention makes it possible to remedy at least a part of the above-mentioned drawbacks, in a simple, efficient and economical way.

According to a first definition, the solution provided here consists in that the blank obtained by casting is a solid polyhedron having first and second sides in which the third and fourth sides extend between the first and second sides, flaring apart from the first side towards the second side, first at a first angle and subsequently, from a break of slope, at a second larger angle, and said at least one part is machined in the blank.

To reach the solution provided here, know-how from various areas of competence (foundry, machining) had to be mobilized. The shapes of the blanks and mould cavities resulting therefrom have a pertaining morphology.

As regards the mould used, it is recommended that it thus comprises at least one mould cavity, preferably one per blank, with such cavity thus having first and second sides in which the third and fourth sides extend between the first and second sides, flaring apart from the first side towards the second side, first at a first angle and subsequently, from a break of slope, at a second larger angle, The mould will preferably be rotating, for the simultaneous moulding of several blanks by centrifugation. The mould will then be connected to means providing rotation about a central axis of rotation and will comprise several mould cavities radially extending about said central axis.

Such technology makes it possible to produce TiAl blanks, more particularly for turbine engine blades.

In the field of turbine engines, the method which the mould is intended for can be applied to the moulding of blades, i.e. parts each having a longitudinal axis, and along such axis, a root at one end, a heel at a second end, and a curved section vane which extends there between.

In this application, it is recommended, (whether combined or not), and so that each blank approaches at least a part of the constraints applied to filling, hardening, stripping and machining of the part, so that the latter complies with the expected characteristics:

that the blank has first and second sides in which the third and fourth sides extend between the first and second sides, flaring apart from the first side towards the second side, first at a first angle and subsequently, from a break of slope, at a second larger angle, that the blank is defined by first and second truncated pyramids, with the second pyramid being an extension of the first pyramid on the larger base of the first pyramid which exactly overlaps the smaller base of the second one, that the third and fourth sides each have a generally trapezoidal shape, that fifth and sixth sides of the blank each have a general shape of two trapezoids, with each a larger base and a smaller base and one extending the other one on the larger base of the first trapezoid which is contiguous to the smaller base of the second trapezoid.

that the blank has a plane of symmetry perpendicular to the first and second sides which will then be mutually parallel, that the first angle mentioned ranges from 0° to 15°, and preferably from 0° to 8°, that the second angle mentioned is smaller than 120°, and preferably smaller than 90°, that the total flaring angle of the third and fourth sides between the first and second sides ranges from 1° to 15°, and preferably from 3° to 8°, that the break of slope is located at less than 85%, and preferably less than 75%, from the shortest distance between the first and second sides, starting from the first side.

The moulding cavity will be adapted accordingly.

The mould, which is, for instance a permanent mould wherein the alloy is cast, will preferably be made of metal, which shall make it possible to limit the contamination of the blank material by that of the mould.

Figure 2:
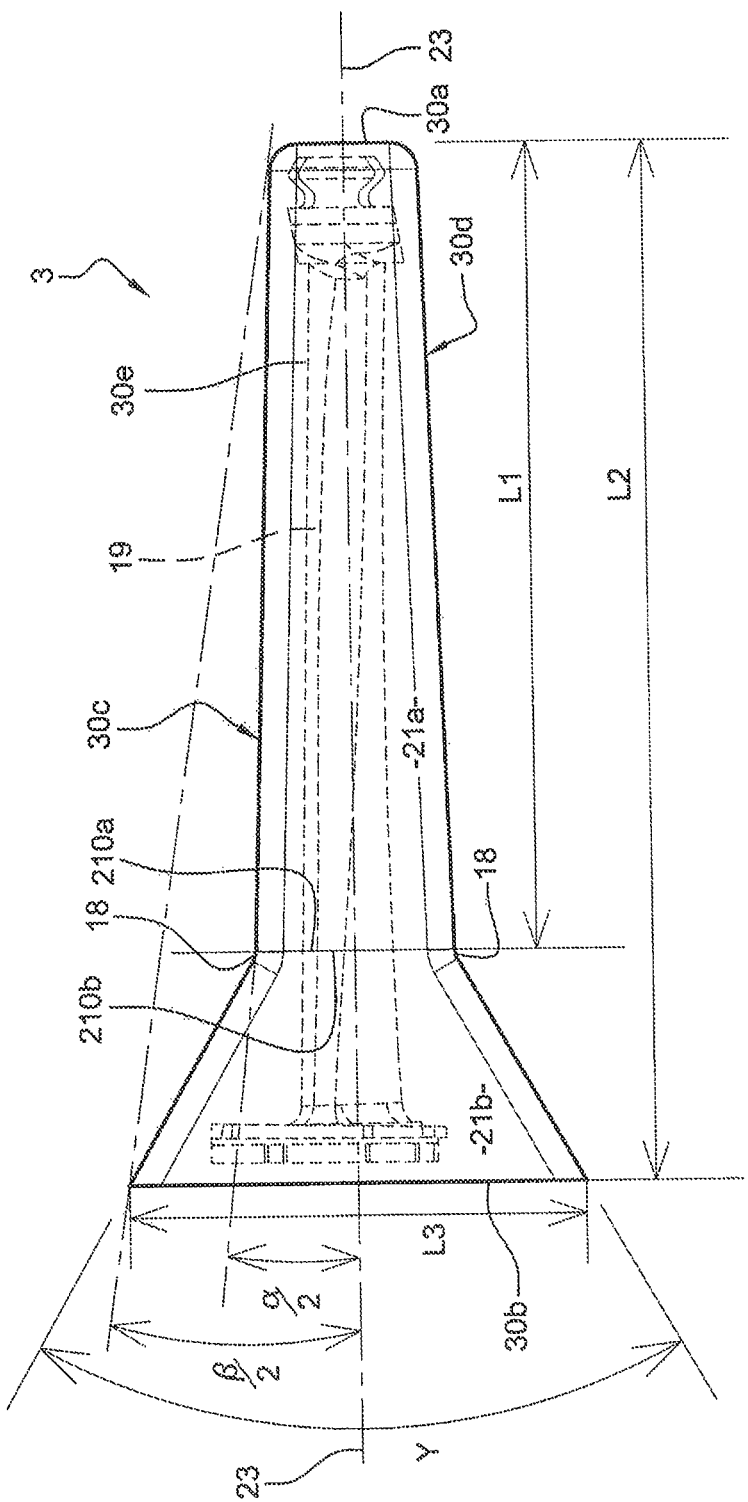

Other characteristics and advantages of the invention will appear upon reading the following description given as a non-restrictive example and while referring to the appended drawings where the FIGS. 3 to 5 have precise dimensions and comply with industrial reality, like dimensioned drawings, wherein:

FIG. 1 schematically shows a device for manufacturing blanks or bars by moulding, FIG. 2 is a front schematic view of a moulded blank, obtained, for instance, using the moulding device of FIG. 1, FIGS. 3, 4, 5 are views of blanks, respectively a front view again, of a cross-sectional (IV-IV arrows), and of a side (V arrow), and FIG. 6 schematically shows a part of the mould, with its cavity for moulding the blank mentioned above.

FIG. 1 thus shows a device 1 for producing blanks or bars 3, while executing successive melting, casting and moulding operations.

The device 1 comprises a closed sealed enclosure 5 whereto a partial vacuum is applied. A TiAl-based metal alloy ingot 7, for example, is fixed at one end of an electrode 9 which is connected to a terminal of a power source, the other terminal of which is connected to a crucible 11 accommodated in the enclosure 5. When the ingot 7 gets closer to the crucible 11, electric arcs are formed between the crucible and the ingot, which causes the melting of the ingot which then falls down to the bottom of the crucible (VSM Vacuum Skull Melting). When melting of the ingot is completed in the crucible, the metal alloy is poured into a preferably metallic and permanent mould 13.

Such mould 13 makes it possible to cast the alloy by centrifugation. For this purpose, the mould is rotated about an axis A using an engine 15.

The mould comprises several recesses or cavities, such as 17a, 17b, here, which radially extend about the axis A, which is vertical here. The alloy to be cast is brought to the centre and the rotation of the mould distributes it into the cavities. It is recommended for the cavities to be regularly spaced about such axis.

The axis A will preferably be vertical and the axis (such as 170a, 170b here) in each cavity will be horizontal. In FIG. 1, the mould cavities, such as 17a, 17b, are not shown with the optimized shape(s) thereof, particularly to suit the moulding of a blank 3 complying with that of FIGS. 2 to 5.

The centrifugal forces generated by the rotation of the mould force the molten alloy into such cavities to fill same.

When cooling is completed, the mould 13 is disassembled and the cast parts are extracted.

The shape of the cavities 17a, 17b . . . will of course match that of the parts. The following information regarding the parts or the blanks will thus also apply to the cavities in the mould.

In FIG. 2, which shows the general shape of a moulded blank according to the solution provided here, and which may be one of those bearing reference 3 above, it can immediately be seen that such bar or blank 3 is totally solid, is a polyhedron and has, among the faces of such polyhedron, first and second sides 30a,30b in which the third and fourth sides 30c,30d extend between the first and second sides, flaring apart from the first side 30b towards the second side 30a, first at a first angle α and subsequently, from a break of a slope 18, at an angle γ larger than the first one. As shown, the angles in the blank will be rounded.

The part 19, here a blade for a turbine engine, will be machined in the blank in its solid state.

In the preferred embodiment illustrated which favours an optimized machining, as regards the quality of the end parts and the material used, the blank 3 is somehow defined by a first and a second pyramid, respectively 21a, 21b, with each one being truncated in a common plane.

The second pyramid is an extension of the first pyramid on the smaller base 210b of the second pyramid which exactly overlaps the larger base 210a of the first pyramid.

As shown, in the complete blank, the first and second pyramids are thus only one.

In order to still optimize the high quality of the end parts and the lowest consumption of material possible, it is specifically recommended, as best illustrated in FIGS. 3 to 5, that:

the third and fourth sides 30c,30d each have a generally trapezoidal shape, and/or fifth and sixth sides 30e,30f of the blank each have a general shape of two trapezoids, with each a larger base such as 300e for that of the first trapezoid of the fifth side 30e, and a smaller base such as 310e for that of the second trapezoid of the same side 30e, and one extending the other one on the larger base of the first trapezoid which is contiguous to the smaller base of the second trapezoid.

It is reminded that a trapezoid is a quadrilateral, with two parallel opposing sides called bases.

The blank 3 may have a plane 23 of symmetry perpendicular to the first and second sides 30a,30b.

To preserve the overall balance of the blank shape and the desired material saving, as regards the production of such blade 19, it is recommended that the sides 30a,30b are mutually parallel.

Besides, it is recommended:

that the sixth side 30f is perpendicular to the first and second sides 30a,30b, and preferably, that the fifth and sixth sides 30e,30f form an angle α2 ranging from 0° to 15°, and preferably from 0° to 8°.

As regards the values to be provided for the other angles mentioned:

that the first angle α ranges from 0° to 15°, and preferably from 0° to 8°, that the second angle γ is smaller than 120°, and preferably smaller than 90°, that the total flaring angle β (addition of α and γ angles) of the third and fourth sides (30c,30d) between the first and second sides (30a,30b) ranges from 1° to 15°, and preferably from 3° to 8°, As for the break of slope 18, it should be positioned at less than 85%, and preferably less than 75%, from the shortest distance L2 between the first and second sides 30a,30b, starting from the first side 30a (L1/L2=0.85, and preferably less than 0.75, with L1: shortest distance between the first side 30a and the break of slope 18).

It can be noted from FIGS. 2 to 5 that the complete blank thus preferably has eight flat faces.

The above-mentioned rules for designing the blank will enable the filling of the mould and an appropriate hardening, an optimised positioning of the part 19 to be machined in the blank and an overall volume of such blank so defined as to minimise machining times.

As regards this part 19, it can be seen in the figures that if the part is a blade, it will have (FIG. 3) a longitudinal axis 191b and, along this axis, a root 193b adjacent to an internal platform 195b (FIG. 5), at a first end, a heel (or external platform) 192b at a second end, and a curved section vane 194b (FIGS. 4,5) which extends between the platforms. The longitudinal axis 191b may cross the geometrical centre of the root and of the heel. It crosses the opposing sides 30a,30b.

The blade vane will advantageously be machined, with the convex face thereof (FIG. 4) being oriented towards the face 30c, with the opposite concave face thus being oriented towards the face 30d.

It should also be noted that the heel (or external platform) 192b is provided to be machined facing, and close to the side 30b, whereas the internal platform 193b is close to the opposing side 30a.

If, as preferred, the blanks 3 are cast by centrifugation into a rotating mould, such as mould 13, a shell mould will preferably be used.

As regards the mould cavities, the following is recommended, as illustrated in FIG. 6 wherein the blank to be moulded is the one shown in the preceding FIGS. 2 to 5.

As already mentioned above, the concerned mould thus comprises (at least) a cavity 17b for moulding the blank which has first and second sides 171a,171b in which the third and fourth sides extend between the first and second sides 171c,171d, flaring apart from the first side towards the second side, first at a first angle and subsequently, from a break of slope 180, at a second larger angle.

As mentioned above, it is also recommended that:

the third and fourth sides 171c,171d each have a generally trapezoidal shape, and/or fifth and sixth sides 171e,171f of the cavity each have a general shape of two trapezoids, with each a larger base and a smaller base and one extending the other one on the larger base of the first trapezoid which is contiguous to the smaller base of the second trapezoid.

In the example, the opening giving access to the (each) cavity, reference 23b, is positioned on the trimmed lateral side 171b towards which the larger base of the larger pyramid will be moulded. The opposing side 171a defines a closed bottom for the cavity.

The mould enclosure consists (at least) of two shells 25a,25b, with each one integrating a part of the concerned mould cavity, here 17b.

The metal alloy enters the cavity through the opening 23b (refer to the arrow in FIG. 6), and the hardened moulded blank 3 could even leave it there through; a simpler stripping of the blank will however be possible when using separable shells 25a,25b.

In a particular embodiment, each blank may have a length L2, between the sides 30a,30b ranging from 20 to 500 mm, and a length L3 on the side 30a ranging from 10 to 100 mm.

The invention claimed is:

1. A method for producing at least one metal turbine engine part, comprising:
   casting a metal alloy in a mould in order to produce a blank; and
   machining the blank in order to produce the at least one part,
   wherein the blank obtained by casting is an externally solid polyhedron having only eight external sides, including first, second, third, and fourth sides, the third and fourth sides extending between the first and second sides and flaring apart from the first side towards the second side, first at a first angle and subsequently, from a break of slope, at a second larger angle larger than the first angle, and said at least one part is machined in the blank.

2. The method according to claim 1, wherein the blank is externally defined by first and second truncated pyramids, so that external sides of the blank are defined by said first and second truncated pyramids, the first and second truncated pyramids each having a larger base and a smaller base, each base having a surface, the surface of the larger base exceeding the surface of the smaller base, the second truncated pyramid being an extension of the first truncated pyramid on the larger base of the first pyramid which exactly overlaps the smaller base of the second truncated pyramid.

3. The method according to claim 1, wherein:
   said at least one part is a blade comprising a longitudinal axis and, along such axis, a root at a first end, a heel at a second end, and a curved section vane which extends there between and has a first convex side and a second concave side, and
   fifth and sixth sides of the blank each have a general shape of a first and a second trapezoid that extend in the same plane, each of said trapezoids having a larger base and a smaller base each having a surface, the surface of the larger base exceeding the surface of the smaller base, and one of said trapezoids extending the other of said trapezoids on the larger base of the first trapezoid which is contiguous to the smaller base of the second trapezoid.

4. A moulded blank, wherein the moulded blank comprises an externally solid polyhedron having only eight external sides, including first, second, third, and fourth sides, said third and fourth sides extending between the first and second sides and flaring apart from the first side towards the second side, first at a first angle and subsequently, from a break of slope, at a second angle larger than the first angle.

5. The moulded blank according to claim 4, wherein the third and fourth sides each have a generally trapezoidal shape.

6. The moulded blank according to claim 4, wherein the moulded blank has a plane of symmetry perpendicular to the first and second sides which are mutually parallel.

7. The moulded blank according to claim 4, wherein:
   the first angle α ranges from 0° to 15°,
   the second angle γ is smaller than 120°,
   the third and fourth sides have a total flaring angle, between the first and second sides, which ranges from 1° to 15°, and
   the break of slope is located at less than 85%, from the shortest distance between the first and second sides, starting from the first side.

8. The moulded blank according to claim 4, wherein:
   the moulded blank further comprises fifth and sixth sides,
   the third and fourth sides each have a generally trapezoidal shape, and
   the fifth and sixth sides each have a general shape of a first and a second trapezoid, each of said trapezoids having a larger base and a smaller base, each of said larger and smaller bases having a surface, the surface of the larger base exceeding the surface of the smaller base, and one of said trapezoids extending the other of said trapezoids, on the larger base of the first trapezoid which is contiguous to the smaller base of the second trapezoid.

9. A moulded blank, wherein the moulded blank is externally defined by first and second truncated pyramids, so that external sides of the blank are defined by said first and second truncated pyramids, each of said first and second truncated pyramids comprising a larger base and a smaller base, each of said larger and smaller bases having a surface, the surface of the larger base exceeding the surface of the smaller base, and the second truncated pyramid being an extension of the first truncated pyramid on the larger base of the first pyramid which exactly overlaps the smaller base of the second truncated pyramid,
   wherein a length of the moulded blank is delimited by the smaller base of the first truncated pyramid and the larger base of the second truncated pyramid.

10. A mould for implementing a method for producing at least one metal turbine engine part, comprising:
    casting a metal alloy in a mould in order to produce a blank; and
    machining the blank in order to produce the at least one part,
    wherein the blank obtained by casting is an externally solid polyhedron having only eight external sides, including first, second, third, and fourth sides, the third and fourth sides extending between the first and second sides and flaring apart from the first side towards the second side, first at a first angle and subsequently, from a break of slope, at a second larger angle larger than the first angle, and said at least one part is machined in the blank, the mould comprising at least one cavity for moulding therein a blank, the cavity comprising:
    first and second sides located at the opposite one from the other and respectively defining a bottom and an opening for entering a metal alloy into the cavity, and
    third and fourth sides, said third and fourth sides extending between the first and second sides and flaring apart from the second side towards the first side, first at a first angle and subsequently, from a break of slope, at a second angle larger than the first angle.

11. The mould according to claim 10, wherein:
the first angle (α) ranges from 0° to 15°,
the second angle (γ) is smaller than 120°,
the third and fourth sides have a total flaring angle, between the first and second sides, which ranges from 1° to 15°,
and the break of slope is located at less than 85%, from the shortest distance between the first and second sides, starting from the first side.

12. A mould for implementing a method for producing at least one metal turbine engine part, comprising:
casting a metal alloy in a mould in order to produce a blank; and
machining the blank in order to produce the at least one part,
wherein the blank obtained by casting is a solid polyhedron having first, second, third, and fourth sides, the third and fourth sides extending between the first and second sides and flaring apart from the first side towards the second side, first at a first angle and subsequently, from a break of slope, at a second larger angle larger than the first angle, and said at least one part is machined in the blank, the mould comprising at least one cavity for moulding therein a blank externally defined by first and second truncated pyramids, so that external sides of the blank are defined by said first and second truncated pyramids, each of said first and second truncated pyramids having a larger base and a smaller base, each of said larger and smaller bases having a surface, the surface of the larger base exceeding the surface of the smaller base, and the second truncated pyramid being an extension of the first truncated pyramid on the larger base of the first truncated pyramid which exactly overlaps the smaller base of the second truncated pyramid, wherein a length of the moulded blank is delimited by the smaller base of the first truncated pyramid and the larger base of the second truncated pyramid.

13. A mould for implementing a method for producing at least one metal turbine engine part, comprising:
casting a metal alloy in a mould in order to produce a blank; and
machining the blank in order to produce the at least one part,
wherein the blank obtained by casting is an externally solid polyhedron having only eight external sides, including first, second, third, and fourth sides, the third and fourth sides extending between the first and second sides and flaring apart from the first side towards the second side, first at a first angle and subsequently, from a break of slope, at a second larger angle larger than the first angle, and said at least one part is machined in the blank,
the cavity has first, second, third, fourth, fifth and sixth sides,
the first and second sides are located at the opposite one from the other and respectively define a bottom and an opening for entering a metal alloy into the cavity,
the third and fourth sides extend between the first and second sides,
each of the third and fourth sides has a general trapezoidal shape, and,
the fifth and sixth sides each have a general shape of a first and a second trapezoid, each of said trapezoids having a larger base and a smaller base, each of said larger and smaller bases having a surface, the surface of the larger base exceeding the surface of the smaller base, and one of said trapezoids extending the other of said trapezoids on the larger base of the first trapezoid which is contiguous to the smaller base of the second trapezoid.

14. A method for producing at least one metal turbine engine part, comprising:
casting a metal alloy in a mould in order to produce a blank; and
machining the blank in order to produce the at least one part,
wherein the blank obtained by casting is an externally solid polyhedron having only eight external sides, including first, second, third, and fourth sides, the third and fourth sides extending between the first and second sides and flaring apart from the first side towards the second side, first at a first angle and subsequently, from a break of slope, at a second larger angle larger than the first angle, and said at least one part is machined in the blank, and wherein:
the third and fourth sides each have a generally trapezoidal shape, and
the solid polyhedron further comprises fifth and sixth sides, each having a general shape of a first and a second trapezoids, each of said trapezoids having a larger base and a smaller base, each of said larger and smaller base having a surface, the surface of the larger base exceeding the surface of the smaller base, and one of said two trapezoids extending the other of said two trapezoids on the larger base of the first trapezoid which is contiguous to the smaller base of the second trapezoid.

* * * * *